United States Patent
Barsness et al.

(10) Patent No.: US 10,579,624 B2
(45) Date of Patent: Mar. 3, 2020

(54) TUPLE ATTRIBUTE EXPIRY MANAGEMENT

(71) Applicant: International Business Machines Corporation, Armonk, NY (US)

(72) Inventors: Eric L. Barsness, Pine Island, MN (US); Daniel E. Beuch, Rochester, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 15/401,055

(22) Filed: Jan. 8, 2017

(65) Prior Publication Data

US 2018/0196841 A1 Jul. 12, 2018

(51) Int. Cl.
*G06F 16/00* (2019.01)
*G06F 16/2455* (2019.01)
*G06F 16/28* (2019.01)
*G06F 16/2453* (2019.01)
*G06F 16/20* (2019.01)

(52) U.S. Cl.
CPC ........ *G06F 16/24568* (2019.01); *G06F 16/20* (2019.01); *G06F 16/24537* (2019.01); *G06F 16/24549* (2019.01); *G06F 16/284* (2019.01)

(58) Field of Classification Search
CPC .......... G06F 16/2458; G06F 16/90335; G06F 16/2462; G06F 16/254; G06F 16/2453; G06F 16/20; G06F 16/24568
See application file for complete search history.

(56) References Cited

U.S. PATENT DOCUMENTS

| 7,246,116 | B2 * | 7/2007 | Barsness | ............. | G06F 16/2462 707/714 |
| 7,617,497 | B1 | 11/2009 | Nadkarni | | |
| 7,945,540 | B2 * | 5/2011 | Park | ................... | G06F 16/2458 707/692 |
| 7,962,442 | B2 * | 6/2011 | Barsness | ........... | G06F 16/90335 707/600 |
| 2008/0275891 | A1 * | 11/2008 | Park | ................... | G06F 16/2458 |

(Continued)

OTHER PUBLICATIONS

T Ghanem et al., "Query Processing using Negative Tuples in Stream query engines" Purdue e-Pubs, a service of the Purdue University Libraries, Nov. 2004 (Revised Apr. 2005), pp. 1-36.*

(Continued)

*Primary Examiner* — Srirama Channavajjala
(74) *Attorney, Agent, or Firm* — Daniel Yeates

(57) ABSTRACT

Disclosed aspects relate to tuple attribute expiry management in a stream computing environment to process a stream of tuples. A tuple may be received. The tuple may include a tuple attribute that has a first attribute value. An expiry criterion may be determined for the first attribute value of the tuple attribute. An achievement of the expiry criterion for the first attribute value of the tuple attribute may be detected. The tuple attribute related to the first attribute value may be modified. The modification of the tuple attribute may occur in response to detecting the achievement of the expiry criterion for the first attribute value of the tuple attribute.

17 Claims, 9 Drawing Sheets

(56) References Cited

U.S. PATENT DOCUMENTS

| | | | |
|---|---|---|---|
| 2010/0281028 A1* | 11/2010 | Luo | G06F 16/2453 |
| | | | 707/741 |
| 2012/0047505 A1* | 2/2012 | Branson | G06F 16/254 |
| | | | 718/100 |
| 2014/0095506 A1* | 4/2014 | Branson | G06F 16/20 |
| | | | 707/737 |
| 2014/0164434 A1 | 6/2014 | Branson et al. | |
| 2015/0334155 A1 | 11/2015 | Bragstad et al. | |
| 2017/0116050 A1 | 4/2017 | Thukkaram et al. | |
| 2017/0116283 A1 | 4/2017 | Park et al. | |
| 2018/0253343 A1 | 9/2018 | Park et al. | |

OTHER PUBLICATIONS

Albrecht Schmidt and Christian S. Jensen, "Efficient Management of Short-Lived Data", A Timecenter Technical Report, May 14, 2005, pp. 1-22.*

IBM, "A Method and System for Determining missing values in Unstructured data using Structured data and business logic"; <http://ip.com/IPCOM/000186032D>; Aug. 6, 2009.

Luo, Gang, et al.; "SAO: A Stream Index for Answering Linear Optimization Queries"; IEEE 23rd International Conference on Data Engineering, 2007.

* cited by examiner

TUPLE ATTRIBUTE EXPIRY MANAGEMENT

BACKGROUND

This disclosure relates generally to computer systems and, more particularly, relates to managing tuple attribute expiry for a stream computing environment. The amount of data that needs to be managed by enterprises is increasing. Tuple attribute expiry management may be desired to be performed as efficiently as possible. As data needing to be managed increases, the need for management efficiency may increase.

SUMMARY

Aspects of the disclosure relate to tuple attribute expiry management in a stream computing environment to process a stream of tuples. Tuples associated with one or more attributes that may expire can be tracked and managed in such a way as to reduce the amount of data in an application or operator graph. Tuples that are associated with potential expiration may be detected, and one or more tuple attribute modification operations may be performed to manage the tuple. The tuple attribute modification operations may include removing expiring tuple attributes from an operation graph. The tuple attribute modification operations may include configuring an expiring tuple attribute value to a null value or a default value. The tuple attribute modification operations may include reverting or rolling-back expiring tuple attributes to a previous version or prior saved state.

Disclosed aspects relate to tuple attribute expiry management in a stream computing environment to process a stream of tuples. A tuple may be received. The tuple may include a tuple attribute that has a first attribute value. An expiry criterion may be determined for the first attribute value of the tuple attribute. An achievement of the expiry criterion for the first attribute value of the tuple attribute may be detected. The tuple attribute related to the first attribute value may be modified. The modification of the tuple attribute may occur in response to detecting the achievement of the expiry criterion for the first attribute value of the tuple attribute.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
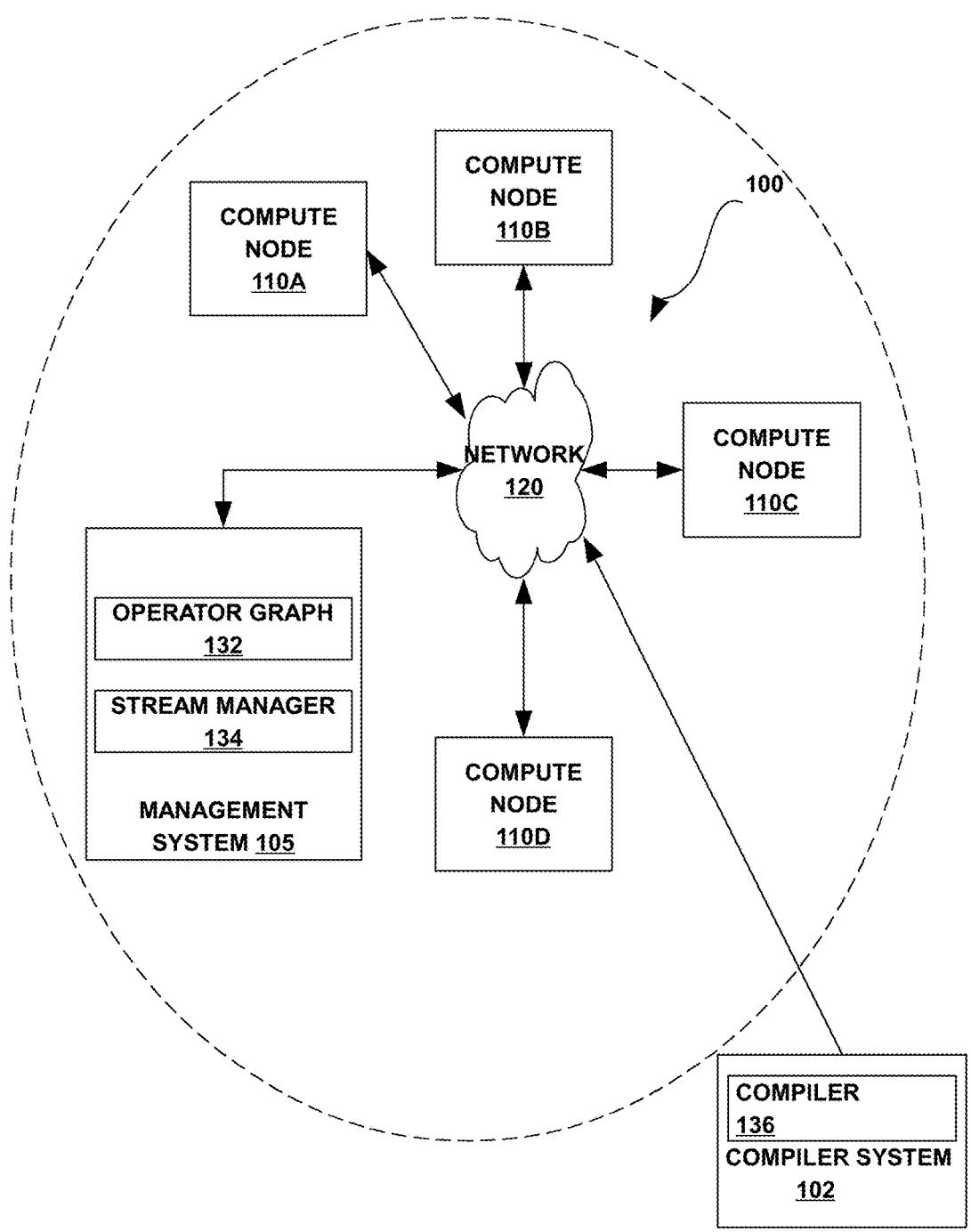
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to tuple attribute expiry management in a stream computing environment to process a stream of tuples. Tuples associated with one or more attributes that may expire can be tracked and managed in such a way as to reduce the amount of data in an application or operator graph. Tuples that are associated with potential expiration may be detected, and one or more tuple attribute modification operations may be performed to manage the tuple. The tuple attribute modification operations may include removing (e.g., dropping) expiring tuple attributes from an operation graph. The tuple attribute modification operations may include configuring an expiring tuple attribute value to a null value or a default value. The tuple attribute modification operations may include reverting or rolling-back expiring tuple attributes to a previous version or prior saved state. Leveraging tuple expiration detection and tuple attribute modification operations may be associated with benefits including stream application performance, tuple processing efficiency, and computer resource usage.

Stream computing relates to a distributed computing environment where data maintained in tuples is acted upon by stream operators, and sometimes modified and transformed for transmission to subsequent stream operators. Operator may be linked together to assemble an operator graph, which may represent an executable portion of a particular streaming application. Aspects of the disclosure relate to the recognition that, in some situations, the amount of data flowing through the operator graph may increase to the point where congestion may occur, resulting in bottlenecks as tuples build up at one or more points in the operator graph. Accordingly, aspects of the disclosure relate to determining tuples that are associated with expired (e.g., outdated, inaccurate, or no longer relevant) tuple attributes, and modifying these tuples to positively impact the tuple management efficiency of the stream computing environment. In this way, aspects of the disclosure may be associated with processor and memory efficiency, stream application performance, and tuple management performance.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In some cases a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, map, list, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to a system, method, and computer program product for tuple attribute expiry management in a stream computing environment to process a stream of tuples. A tuple may be received. The tuple may include a tuple attribute that has a first attribute value. An expiry criterion may be determined for the first attribute value of the tuple attribute. An achievement of the expiry criterion for the first attribute value of the tuple attribute may be detected. The tuple attribute related to the first attribute value may be modified. The modification of the tuple attribute may occur in response to detecting the achievement of the expiry criterion for the first attribute value of the tuple attribute.

In embodiments, a tuple attribute of a tuple may be identified as an expiry target. In embodiments, a set of meta-data which indicates an expiry criterion for the first attribute value of the tuple attribute may be embedded in association with the tuple attribute. In embodiments, in response to detecting the achievement of the expiry criterion for the first attribute value of the tuple attribute, a tuple attribute modification operation to modify the tuple attribute related to the first attribute value may be performed. In embodiments, performing the tuple attribute modification operation may include eliminating the tuple attribute of the tuple. In embodiments, performing the tuple attribute modification operation may include introducing a predetermined attribute value for the first attribute value. In embodiments, performing the tuple attribute modification operation may include reverting the first attribute value to a historical attribute value of the tuple attribute. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 4:
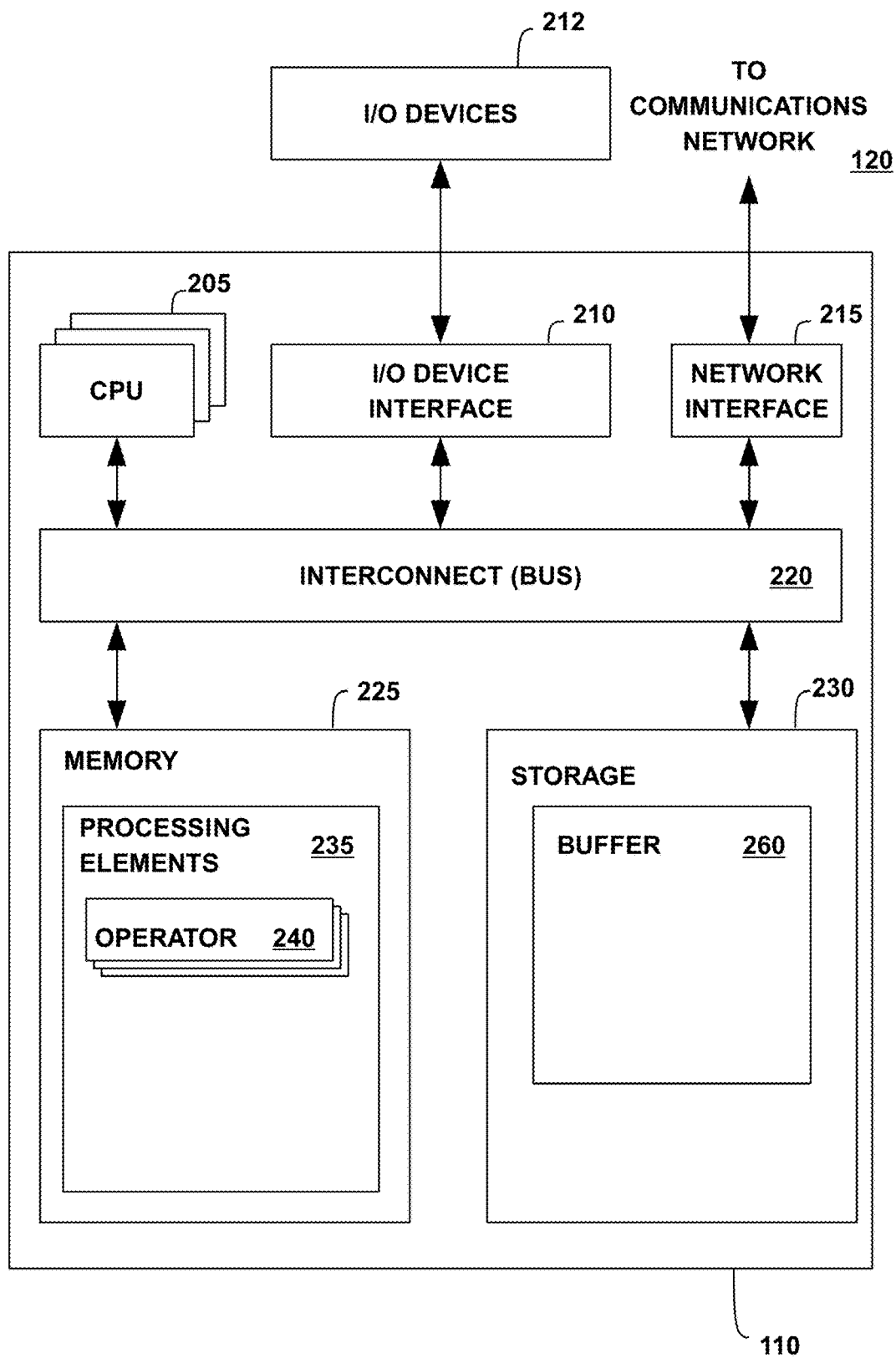
FIG. 4 illustrates a view of a compute node according to embodiments.

FIG. 4 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 2:
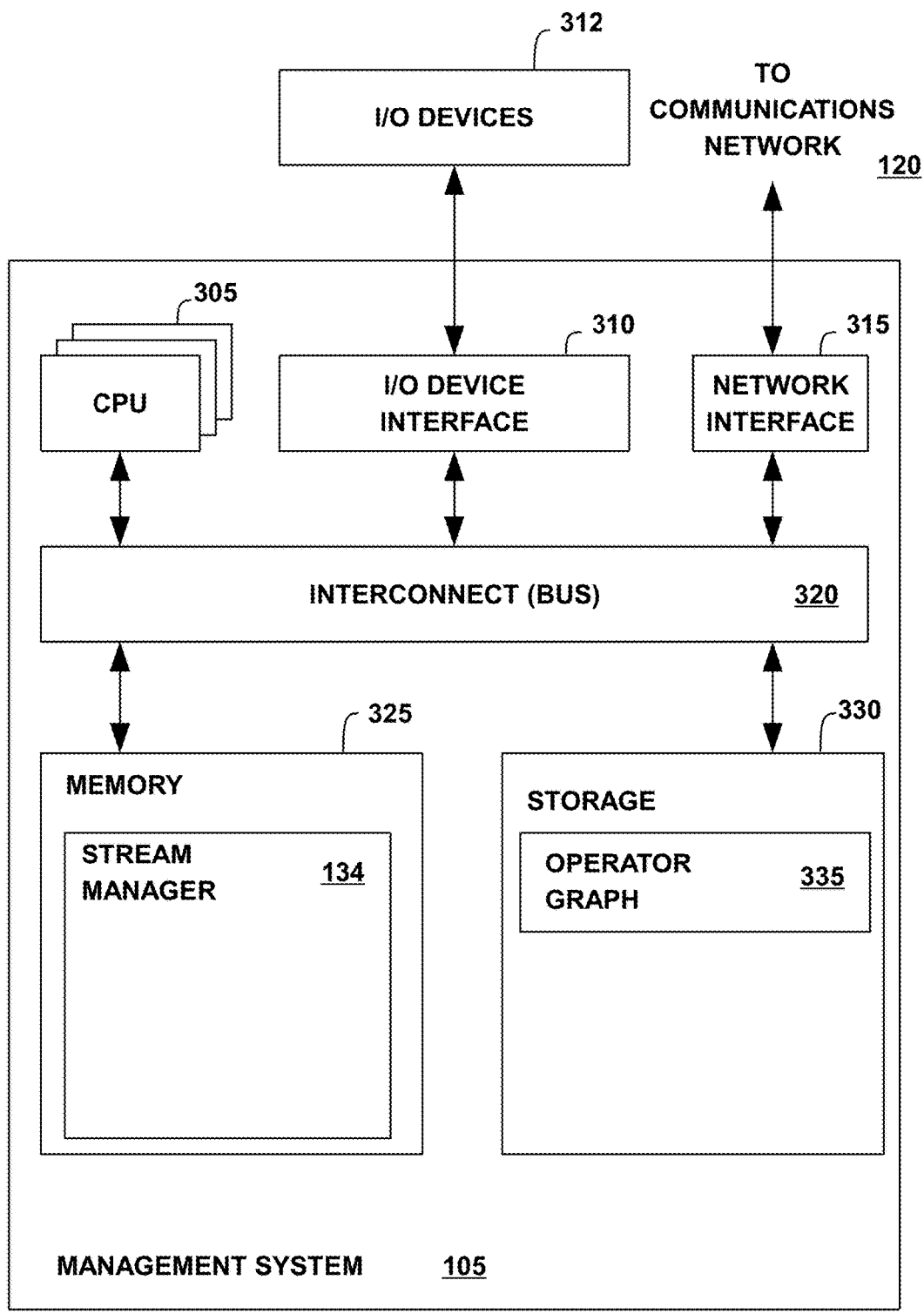
FIG. 2 illustrates a view of a management system according to embodiments.

FIG. 2 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 4) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 3:
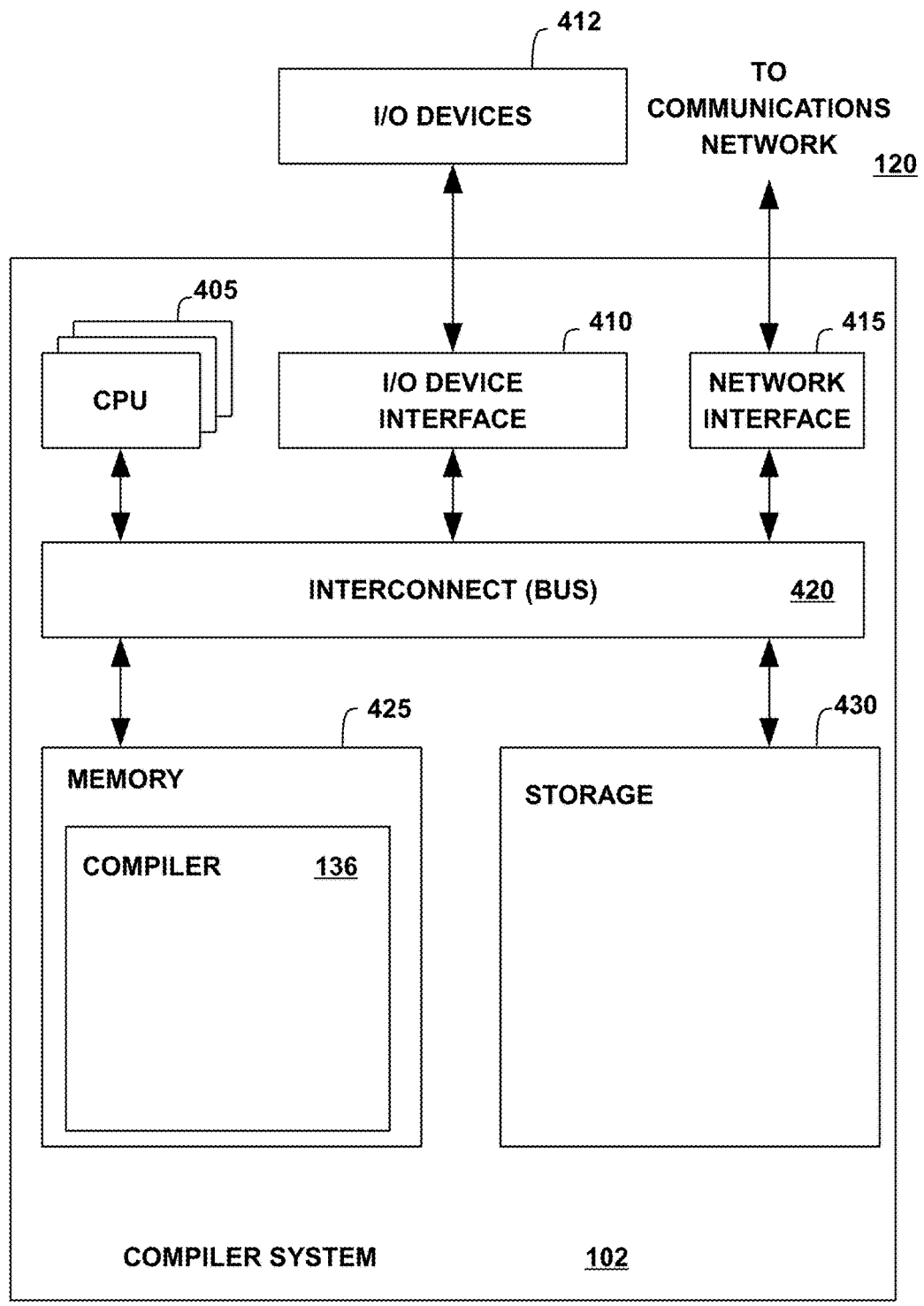
FIG. 3 illustrates a view of a compiler system according to embodiments.

FIG. 3 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
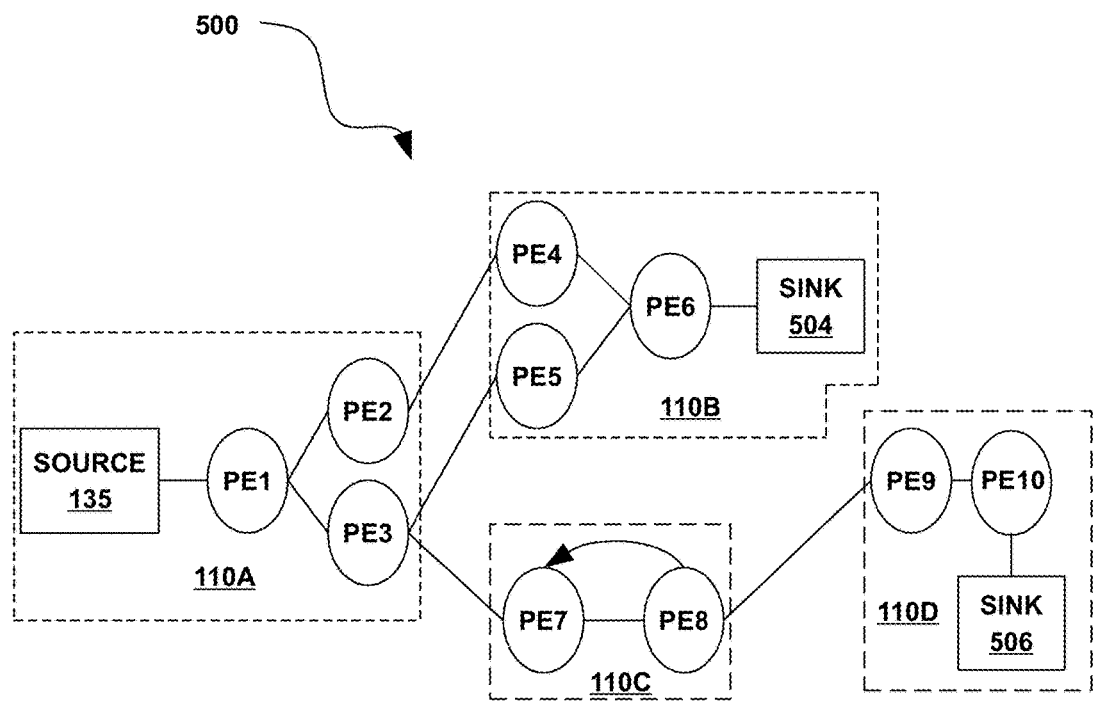
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
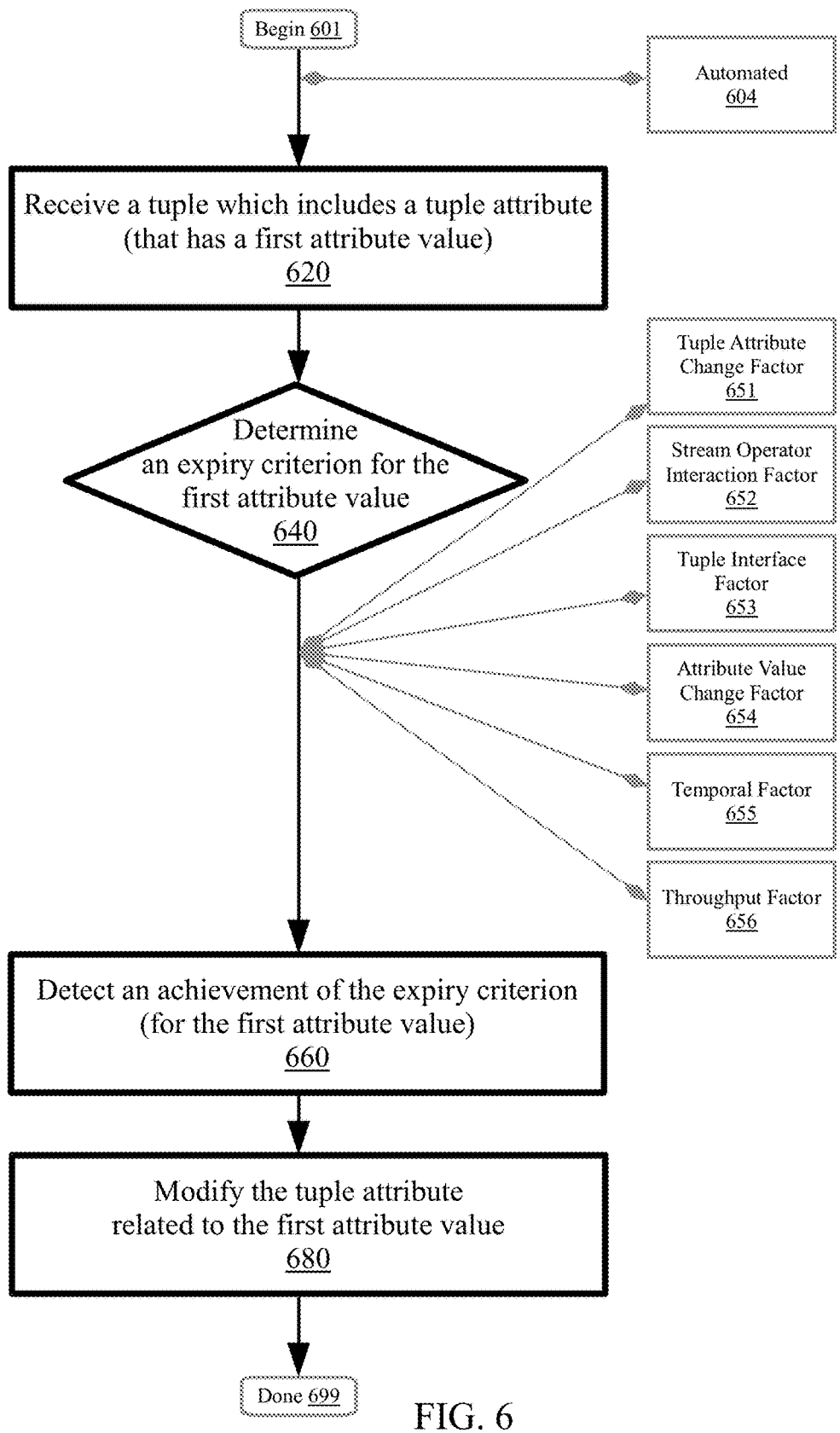
FIG. 6 is a flowchart illustrating a method for tuple attribute expiry management in a stream computing environment, according to embodiments.

FIG. 6 is a flowchart illustrating a method 600 for tuple attribute expiry management in a stream computing environment to process a stream of tuples. The stream computing environment may include one or more stream operators (e.g. processing elements) configured to perform operations (logic-based analysis, attribute modification) on data (e.g., tuples) as part of a stream computing application. Aspects of the disclosure relate to the recognition that, in some situations, stream computing environments may handle large amounts of data, sometimes resulting in congestion, bottlenecks, decreased tuple throughput rate, or other tuple-processing challenges. Accordingly, aspects of the disclosure relate to detecting expiring/expired tuple attributes of a tuple, and managing the tuple so as to positively impact tuple traffic flow in the stream computing environment. As an example, an expired tuple attribute may be set to a null value or removed from an operator graph to reduce the amount of data or information in the stream computing environment. Aspects of FIG. 6 relate to modifying a tuple attribute of a tuple in response to detecting achievement of an expiry criterion for the tuple. Leveraging tuple expiration detection and tuple attribute modification operations may be associated with benefits including stream application performance, tuple processing efficiency, and computer resource usage. The method 600 may begin at block 601.

In embodiments, the receiving, the detecting, the determining, the modifying, and other steps described herein may each occur in an automated fashion at block 604. In embodiments, the receiving, the detecting, the determining, the modifying, and other steps described herein may be carried out by an internal tuple attribute expiry management module maintained in a persistent storage device of a stream application host node or locally connected hardware device. In embodiments, the receiving, the detecting, the determining, the modifying, and other steps described herein may be carried out by an external tuple attribute expiry management module hosted by a remote computing device or server (e.g., accessible via a subscription, usage-based system, or other service model). In this way, aspects of tuple attribute expiry management may be performed using automated computing machinery without user intervention or manual action. Other methods of performing the steps described herein are also possible.

At block 620, a tuple may be received. The tuple may include a tuple attribute that has a first attribute value. Generally, receiving can include sensing, detecting, recognizing, identifying, collecting, or otherwise accepting delivery of a tuple including a tuple attribute that has a first attribute value. The tuple attribute may include a characteristic, property, feature, trait, parameter, or other aspect that defines, describes, or characterizes a tuple. As an example, a tuple may include a tuple attribute of "temperature" to indicate that the tuple relates/pertains to the temperature of an object or substance (e.g., the temperature of a computer processing unit). In embodiments, a tuple attribute may be associated with a first attribute value. The first attribute value may include a number, letter, magnitude, word, quality, count, integer, or other string or sequence of one or more characters. In embodiments, the first attribute value may indicate a quantitative factor of an associated attribute value. As an example, a tuple including a tuple attribute of "temperature" may be associated with a first attribute value of "21"C." In embodiments, receiving the tuple may include capturing the tuple from a stream of tuples flowing through an operator graph. The captured tuple may be parsed by a stream operator to detect the tuple attribute and the first attribute value indicated by the tuple. In embodiments, the captured tuple may be parsed by a management run-time engine of the stream computing environment. Other methods of receiving the tuple including a tuple attribute having a first attribute value are also possible.

At block 640, an expiry criterion may be determined for the first attribute value of the tuple attribute. Aspects of the disclosure relate to the recognition that, in some situations, tuples may contain attributes that are outdated, inaccurate, or no longer relevant to a stream computing application.

Accordingly, aspects of the disclosure relate to determining an expiry criterion for one or more tuple attributes (e.g., such that tuples with expired/irrelevant attributes can be managed to positively impact stream application performance). Generally, determining can include deriving, calculating, computing, identifying, formulating, or otherwise ascertaining the expiry criterion for the first attribute value of the tuple attribute. The expiry criterion may include a parameter, guideline, benchmark, principle, or other factor that indicates the degree or extent to which a first attribute value of a tuple attribute is relevant, useful, reliable, or otherwise valid with respect to the stream computing application. As an example, for a tuple with a tuple attribute of temperature and an associated first attribute value of "32° C.," an expiry criterion may be determined that indicates that the first attribute value of "32° C." is valid for a 2-hour period, beyond which it is considered to be expired (e.g., no longer reliable, invalid for processing purposes). In embodiments, the expiry criterion may include a binary indication of whether a particular first attribute value may or may not expire under particular circumstances. As an example, an attribute of "atmospheric pressure" associated with a first attribute value of "101.325 kPA" may be associated with an expiry criterion of "elevation change" (e.g., atmospheric pressure may change based on elevation or other factors) whereas an attribute of "atomic mass of hydrogen" associated with a first attribute value of "1.00794 amu" may not be associated with an expiry criterion (e.g., it is a physical constant). In embodiments, determining the expiry criterion may include utilizing a tuple analysis tool to examine the tuple attribute together with the first attribute value, and ascertaining one or more parameter configurations (e.g., circumstances, situations, conditions) under which the first attribute value may be rendered outdated, invalid, or no longer relevant with respect to the streaming environment. Other methods of determining the expiry criterion for the first attribute value of the tuple attribute are also possible.

In embodiments, configuration of the expiry criterion for the first attribute value of the tuple attribute may occur at block 651. The expiry criterion may be configured to be based on a tuple attribute change factor. Generally, configuring can include setting, programming, modifying, constructing, arranging, or otherwise structuring the expiry criterion to be based on the tuple attribute change factor. The tuple attribute change factor may indicate a degree or extent of change at which a first attribute may be considered to be expired (e.g., outdated, invalid, irrelevant) with respect to a stream computing application. As examples, the tuple attribute change factor may include a threshold number of changes (e.g., 10 changes), a threshold number of changes by a particular source (e.g., 4 changes by a specific streaming operator), a percentage change with respect to an original state (e.g., 25% change from an original value), or a difference with respect to a previous attribute (e.g., attribute of "temperature" changed to an attribute of "barometric pressure"). For instance, consider a tuple including a tuple attribute of "source text" that includes a portion of textual data. In embodiments, the tuple attribute may be modified, and image data may be appended to the tuple such that the tuple attribute of "source text" is changed to a tuple attribute of "source media" (e.g., to represent that text and image data is included in the tuple). Accordingly, as the tuple attribute has changed from a first tuple attribute of "source text" to a second tuple attribute of "source media," the expiry criterion of attribute change factor may indicate that the tuple attribute of "source text" has expired. Other types of tuple attribute change factors are also possible.

In embodiments, configuration of the expiry criterion for the first attribute value of the tuple attribute may occur at block 652. The expiry criterion may be configured to be based on a stream operator interaction factor. Generally, configuring can include setting, programming, modifying, constructing, arranging, or otherwise structuring the expiry criterion to be based on the stream operator interaction factor. The stream operator interaction factor may indicate one or more types of interaction (e.g., contact, processing) between a tuple and one or more stream operators that may affect the expiration of a tuple attribute. In embodiments, the stream operator interaction factor may indicate stream computing configurations in which one or more tuple attributes are considered to be expired as a result of interactions with particular stream operators. As examples, the stream interaction factor may include a change from a first stream operator group to a second stream operator group (e.g., such that different processing operations are performed on the tuple), a threshold number of changes from a particular stream operator or group of stream operators (e.g., 3 flow-path changes), a percentage change by a particular stream operator or group of stream operators (e.g., tuple attribute change of 15%), a sequence of stream operators which operate on the tuple attribute (e.g., sort operator followed by a join operator), a particular stream operator flow (e.g., designated flow-path), or the like. As an example, a tuple attribute of "meeting attendance number" may be considered to be expired in response to being processed by a join operator (e.g., the tuple attribute may be joined/combined with other values or tuple attributes such that the original tuple attribute is no longer considered to be valid). In certain embodiments, the stream operator interaction factor may indicate stream computing configurations in which one or more tuple attributes are considered to be permanent (e.g., non-expiring) in response to interaction with a particular stream operator (e.g., a physical constant such as speed of light in a vacuum may be marked as unaffected by interactions with stream operators). Other types of stream operator factors are also possible.

In embodiments, configuration of the expiry criterion for the first attribute value of the tuple attribute may occur at block 653. The expiry criterion may be configured to be based on a tuple interface factor. Generally, configuring can include setting, programming, modifying, constructing, arranging, or otherwise structuring the expiry criterion to be based on the tuple interface factor. The tuple interface factor may indicate one or more aspects of the stream computing environment that may affect the expiration of a tuple attribute by interfacing with one or more tuples. For instance, the tuple interface factor may include one or host hardware or stream computing environment configurations that may modify (e.g., increase or decrease) the expiration of one or more tuple attributes. As examples, the tuple interface factor may include a designated flow path (e.g., tuple takes a particular branch/path through the operator graph), a particular group of stream computing elements (e.g., stream operators, tuple groups, security protocols), a sequence of actions (e.g., series of particular operations, modifications), or the like. In embodiments, the tuple interface factor may include one or more types of stream operators, machinery, host tagging features, hardware resource allocation configurations, firewall or other security parameters, or other host hardware and software configurations. As an example, in certain embodiments, one or more tuple attributes of a tuple that travels through a consistent region (e.g., zone of guaranteed tuple processing) may be considered to be expired. Other types of tuple interface factors are also possible.

In embodiments, configuration of the expiry criterion for the first attribute value of the tuple attribute may occur at block 654. The expiry criterion may be configured to be based on an attribute value change factor. Generally, configuring can include setting, programming, modifying, constructing, arranging, or otherwise structuring the expiry criterion to be based on the attribute value change factor. The attribute value change factor may indicate a degree or extent of change at which a first attribute value may be considered to be expired (e.g., outdated, invalid, irrelevant) with respect to a stream computing application. As examples, the attribute value change factor may include a threshold number of changes (e.g., 20 changes), a threshold number of changes by a particular source (e.g., 1 changes by a specific streaming operator), a percentage change with respect to an original state (e.g., 30% change from an original value), or a percentage change from a previous value (e.g., first attribute value change of 15% or more). For instance, consider a tuple including a tuple attribute of "file size" associated with a first attribute value of "800 megabytes." In embodiments, the first attribute value may be associated with an expiry criterion that designates an attribute change factor of "5%" (e.g., if the file size increases or decreases by 5%, it may be considered to be expired). Accordingly, in the event that the tuple is processed by a stream operator that compresses the file size to 300 megabytes (e.g., a change to the first attribute value of over 5%), the tuple attribute of "file size" may be considered to be expired. Other types of attribute value change factors are also possible.

In embodiments, configuration of the expiry criterion for the first attribute value of the tuple attribute may occur at block 655. The expiry criterion may be configured to be based on a temporal factor. Generally, configuring can include setting, programming, modifying, constructing, arranging, or otherwise structuring the expiry criterion to be based on the temporal factor. The temporal factor may include a time-based indication of when one or more tuple attributes are considered to be expired. In embodiments, the temporal factor may include a time period (e.g., duration such as 3 hours), specified time and date (e.g., Apr. 3, 2016 and 8:14 PM), chronological sequence (e.g., attribute expires after a particular operation), speed at which a tuple is being processed through an operator graph (e.g., tuples processed below a threshold speed may be considered to be expired), or the like. As examples, the temporal factor may include a number of seconds (e.g., 50 seconds), or a particular time of day (e.g., 4:00 PM). Consider a situation in which an expiry criterion configured to be based on a temporal factor indicates a threshold time period of 90 minutes after processing by a first streaming operator. Accordingly, a tuple attribute of a tuple processed by the first operator may be examined, and it may be determined that 90 minutes and 18 seconds (e.g., an actual elapsed time) have passed since the tuple was processed by the first operator. As the tuple attribute achieves the threshold time period of 90 minutes, it may be considered to be expired. Other types of temporal factor are also possible.

In embodiments, configuration of the expiry criterion for the first attribute value of the tuple attribute may occur at block 656. The expiry criterion may be configured to be based on a throughput factor. Generally, configuring can include setting, programming, modifying, constructing, arranging, or otherwise structuring the expiry criterion to be based on the throughput factor. The throughput factor may indicate a variety of parameters that may influence the expiration of one or more tuple attributes. As examples, the throughput factor may indicate a throughput rate threshold (e.g., 90 tuples per second), an individual tuple speed (e.g., speed with which a particular tuple travels through the operating graph), a congestion factor (e.g., bottleneck or tuple slowdown), a tuple processing time factor (e.g., the average time it takes to process a particular tuple) or the like. In embodiments, tuples that travel through the operator graph below a threshold speed may be considered to be expired and removed from the operator graph to facilitate tuple traffic flow. Consider the following example. A particular operator graph may be associated with a target throughput-rate of 400 tuples per second. The throughput-rate of the operator graph may be analyzed, and it may be determined that the operator graph is currently achieving a throughput-rate of 368 tuples per second. The throughput factor may indicate that those tuples having tuple attributes that take 3 or more seconds to process by a streaming operator may be considered to be expired (e.g., and removed from the operator graph). Accordingly, tuples having tuple attributes that take 3 or more seconds to process may be expired and removed from the operator graph, and the through-put rate of the operator graph may increase to 411 tuples per second. Other types of through-put factor are also possible.

At block 660, an achievement of the expiry criterion for the first attribute value of the tuple attribute may be detected. Generally, detecting can include sensing, recognizing, discovering, identifying, ascertaining, or otherwise determining that the expiry criterion for the first attribute value of the tuple attribute has been achieved. In embodiments, an expiry criterion for a tuple attribute may be considered to be achieved when one or more of the parameters it designates have been fulfilled, completed, attained, satisfied, carried out, or otherwise met. In embodiments, detecting the achievement of the expiry criterion may include examining a group (e.g., batch, portion) of tuples with respect to the expiry criterion, and ascertaining a subset of the set of tuples that meet the parameters specified by the expiry criterion. In certain embodiments, detecting may include utilizing a tuple diagnostic tool to analyze a snapshot (e.g., representation of the tuples at a particular moment in time) of the tuples in the operator graph, and selecting those tuples that achieve the expiry criterion as expired. In certain embodiments, detecting may include configuring one or more stream operators of the operator graph to evaluate one or more tuples that pass through it with respect to a set of expiry criteria, and marking tuples that achieve an expiry criterion for expiration (e.g., and potential removal from the operator graph). Consider the following example. A particular stream computing environment may be associated with an expiry criterion of a tuple interface factor that indicates that tuples having a tuple attribute of "exchange rate" that were processed by a Stream Operator B of the operator graph should be considered to be expired. Accordingly, a Stream Operator C (e.g., stream operator located downstream from Stream Operator B) of the operator graph may be configured to analyze each tuple that is processed with respect to the expiry criterion, and ascertain which tuples both include the tuple attribute of "exchange rate" and were processed by Stream Operator B (e.g., based on an operation log, tags on each tuple). Accordingly, the tuples identified as achieving the expiry criterion may be marked for modification (e.g., removal, reconfiguration). Other methods of detecting the achievement of the expiry criterion for the first attribute value are also possible.

At block 680, the tuple attribute related to the first attribute value may be modified. The modification of the tuple attribute may occur in response to detecting the achievement of the expiry criterion for the first attribute value of the tuple attribute. Aspects of the disclosure, as described herein, relate to the recognition that, in some situations, stream computing environments may handle large amounts of data, some of which may no longer be useful, relevant, or valid to operation of a streaming application. Accordingly, aspects of the disclosure relate to modifying one or more expiring/expired tuple attributes of a tuple so as to positively impact tuple management efficiency in the stream computing environment. Generally, modifying can include altering, adjusting, adapting, revising, configuring, or otherwise changing the tuple attribute related to the first attribute value. In embodiments, modifying may include reconfiguring, reformatting, or otherwise adjusting the tuple attribute to reduce the processing workload of the stream computing environment with respect to the tuple that includes the expired attribute. In embodiments, modifying may include removing (e.g., deleting, erasing, eliminating) the tuple attribute from the tuple. In embodiments, modifying may include adjusting the first attribute value of the expired tuple attribute. For instance, a first attribute value of the expired tuple attribute may be set to a null value (e.g., undefined, placeholder value) that may be ignored by stream operators (e.g., to reduce the processing load of the tuple). As another example, modifying may include setting the first attribute value of the expired tuple attribute to a default value, present value, or previous value (e.g., that may be considered valid; not expired). As an example, in response to determining that a first attribute value of "61° C." for a tuple attribute of "CPU Temperature" is expired (e.g., it was valid for a period when the CPU was under a heavy workload, but is no longer relevant), the first attribute value may be modified to a default temperature value of "53° C." (e.g., an average running temperature for the CPU). Other methods of modifying the tuple attribute are also possible.

Consider the following example. A tuple which includes a tuple attribute of "digital image" may be received by a stream computing environment. The tuple attribute of "digital image" may be associated with a first attribute value of "edit count-4" that indicates how many times the digital image has been modified or edited. In embodiments, the first attribute value may be associated with an expiry criterion of an attribute value change factor that indicates that the tuple attribute of "digital image" may be considered to be expired when the first attribute value reaches an edit count of "10" (e.g., at which point the image may be distorted or modified to such a degree that it is considered irrelevant or invalid for further processing). The tuple may flow through the operator graph of the stream computing environment, and be processed by a number of stream operators. In embodiments, each stream operator that receives the tuple may be configured to evaluate the tuple with respect to the expiry criterion and ascertain whether it has expired or if it is still valid. In embodiments, as described herein, the tuple may be processed by a particular streaming operator that detects that the first attribute value has attained an edit count of 10 changes. Accordingly, as described herein, in response to detecting that the expiry criterion is achieved, the tuple attribute of "digital image" may be edited. For instance, in embodiments, the tuple attribute of "digital image" may be discarded (e.g., removed, deleted, erased) from the tuple. Other methods of tuple attribute expiry management in a stream computing environment are also possible.

Figure 7:
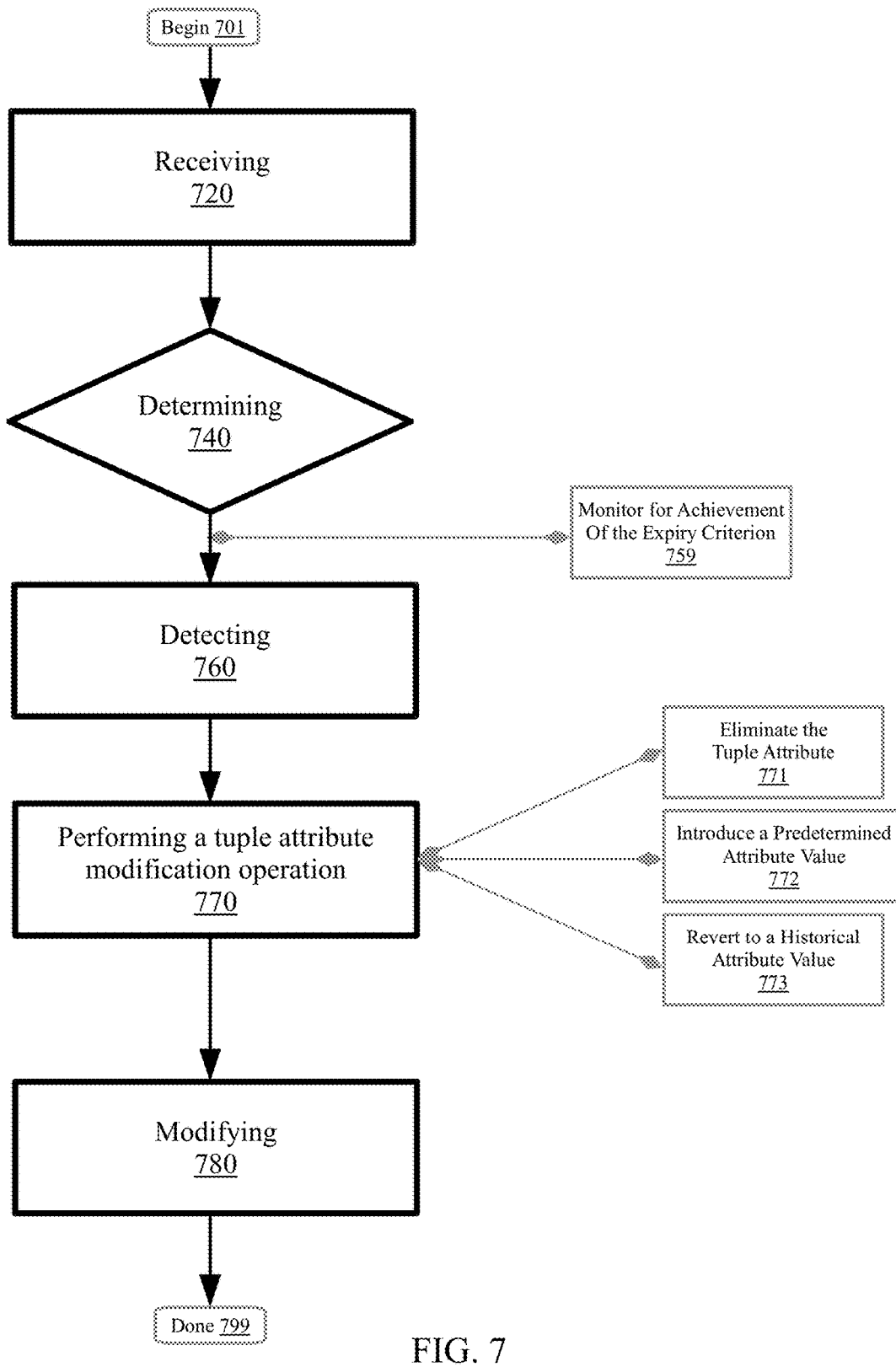
FIG. 7 is a flowchart illustrating a method for tuple attribute expiry management in a stream computing environment, according to embodiments.

Method 600 concludes at block 699. Aspects of method 600 may provide performance or efficiency benefits related to tuple attribute expiry management. As an example, tuple attributes that are no longer useful, relevant, or valid for processing by a stream computing environment may be detected based on one or more expiry criteria and ascertained to be expired. These tuple attributes may be removed, edited, or otherwise modified to positively impact the tuple management efficiency of the stream computing environment (e.g., expired tuple attributes may be removed from the stream to lessen the data load to be processed by stream operators). Altogether, leveraging tuple expiration detection and tuple attribute modification operations may be associated with benefits including stream application performance, tuple processing efficiency, and computer resource usage FIG. 7 is a flowchart illustrating a method 700 for tuple attribute expiry management in a stream computing environment to process a stream of tuples. Aspects of FIG. 7 relate to performing one or more tuple attribute modification operations to positively impact the tuple management efficiency of the stream computing environment. The method 700 may begin at block 701. At block 720, a tuple may be received. The tuple may include a tuple attribute that has a first attribute value. At block 740, an expiry criterion for the first attribute value of the tuple attribute may be determined. At block 760, an achievement of the expiry criterion for the first attribute value of the tuple attribute may be detected. At block 780, the tuple attribute related to the first attribute value may be modified. The modification of the tuple attribute may occur in response to the detection of the achievement of the expiry criterion for the first attribute value of the tuple attribute.

In embodiments, monitoring for the achievement of the expiry criterion for the first value of the tuple attribute may occur at block 759. The monitoring may occur by a streams management run-time engine. Generally, monitoring can include scanning, surveying, auditing, overseeing, observing, supervising, probing, investigating, or otherwise examining for achievement of the expiry criterion. In embodiments, monitoring may include configuring a management run-time engine of the stream computing environment to evaluate a stream of tuples with respect to a set of expiry criteria in order to identify those tuples that achieve one or more expiry criteria. In embodiments, monitoring may be performed periodically by the management run-time engine. For instance, the management run-time engine may be configured to scan the stream of tuples on a temporal basis (e.g., once every 10 seconds, 30 seconds, 1 times), in response to a triggering event (e.g., each time a new stream of tuples enters an operating graph), in response to a network traffic threshold (e.g., tuple congestion, tuple throughput rate below a threshold value) or the like. In embodiments, the monitoring may be performed by the management run-time engine in an ongoing fashion (e.g., continuously). In certain embodiments, tuples may be configured to automatically (e.g., voluntarily) identify themselves as expired in response to achievement of the expiry criterion. For instance, in response to achievement of one or more expiry criteria, a tuple may mark, tag, or flag, itself to indicate that it has expired. The management run-time engine may then be configured to identify those tuples that are marked as expired for a tuple attribute modification operation. Other methods of monitoring for the achievement of the expiry criterion are also possible.

At block 770, a tuple attribute modification operation may be performed. The tuple attribute modification operation may be performed in response to detecting the achievement of the expiry criterion for the first attribute value of the tuple attribute. The tuple attribute modification operation may modify the tuple attribute related to the first attribute value. Generally, performing can include carrying-out, implementing, enacting, instantiating, completing, or otherwise executing the tuple attribute modification operation. The tuple attribute modification operation may include an action, activity, procedure, or other process configured to edit, adjust, reconfigure, or otherwise change one or more tuple attributes to positively impact tuple management efficiency of the stream computing environment. As described herein, the tuple attribute modification operation may include elimination of a tuple attribute (e.g., deletion from a tuple), introduction of a predetermined attribute value (e.g., setting to a default value, null value), reversion of the first attribute value (e.g., to a previous attribute value) or the like. In embodiments, the tuple attribute modification operation may be performed by the management run-time engine of the stream computing environment. For instance, in response to detecting the achievement of the expiry criterion for the first attribute value of a tuple attribute, the management run-time engine may evaluate the nature of the expiry criteria, the type of the tuple, and other aspects of the stream computing environment to determine and execute an appropriate tuple attribute modification operation for the tuple attribute. In embodiments, the tuple attribute modification operation may be performed by one or more stream operators of the stream computing environment. As an example, in response to receiving a tuple including a tuple attribute that achieves an expiry criterion, a stream operator may be configured to perform the tuple attribute modification operation in conjunction with other processing operations on the tuple. Other methods of performing the tuple attribute modification action are also possible.

In embodiments, the tuple attribute modification operation may include the elimination of the tuple attribute of the tuple at block 771. Generally, eliminating can include removing, deleting, erasing, withdrawing, or otherwise discarding the tuple attribute of the tuple. In embodiments, eliminating may include dropping the tuple attribute that achieves the expiry criterion from the tuple. For instance, in certain embodiments, eliminating may include deleting data pertaining to the tuple attribute from the tuple. In embodiments, eliminating may include re-formatting all of or a portion of the tuple to remove the tuple attribute from the tuple. In certain embodiments, eliminating may include marking the tuple attribute that achieves the expiry criterion with a tag or other identifier that indicates that it should be ignored or disregarded with respect to processing by stream operators. In this way, stream operators that process the tuple having the expired tuple attribute may avoid processing the expired tuple attribute. Other methods of performing a tuple attribute modification operation to eliminate the tuple attribute that achieves the expiry criterion are also possible.

In embodiments, the tuple attribute modification operation may include the introduction of a predetermined attribute value for the first attribute value at block 772. Generally, introducing can include generating, assigning, calculating, instantiating, computing, formulating, or otherwise designating a predetermined attribute value. In embodiments, introducing the predetermined attribute value may include replacing the first attribute value (e.g., expired first attribute value) with a null value. The null value may include a placeholder value to indicate that a valid first attribute value for a particular tuple attribute does not exist. As an example, the character omega ($\omega$) may be used to represent the null value of the first attribute. In embodiments, stream operators of the stream computing environment may be configured to disregard (e.g., ignore, discard) the null value when processing the tuple attribute of the tuple. In embodiments, introducing the predetermined attribute value may include setting the first attribute value to a default value. In embodiments, the default value may include a predetermined value that is valid for the particular tuple attribute. In certain embodiments, the default value may include a value that is similar to database defaults for the particular tuple attribute. For instance, the default value may include an average or median value for the tuple attribute calculated based on a set of other tuples or database information. As an example, introducing the null value may include configuring the first attribute value of a tuple attribute of "humidity" to a null value of "$\omega$" to indicate that there is not a valid first attribute value for the tuple attribute. Other methods of introducing the predetermined attribute value are also possible.

In embodiments, the tuple attribute modification operation may include the reverting of the first attribute value at block 773. The first attribute value may be reverted to a historical attribute value of the tuple attribute. Generally, reverting can include returning, assigning, calculating, instantiating, regressing, recurring, repeating, or otherwise changing back to the historical attribute value of the tuple attribute. The historical attribute value may include a prior or previous value of the tuple attribute. For instance, the historical attribute value may include a first attribute value that was valid for the tuple attribute at a previous point in time, or in a previous state. In embodiments, reverting to the historical attribute value of the tuple attribute may include consulting a log of past first attribute values for the tuple attribute, and ascertaining a historical attribute value that is valid (e.g., not expired). The ascertained historical attribute value may be assigned to the first attribute value. Consider the following example. A tuple attribute of "image resolution" may be associated with a first attribute value of "1920×1080" that is determined to be expired (e.g., the tuple attribute has been changed from a first image format to a second image format, resulting in a change to the first attribute value of image resolution). As described herein, a log of past first attribute values for the tuple attribute may be analyzed, and it may be determined that, at a previous point in time, the tuple attribute was associated with a first attribute value of "1280×720" while saved in the second image format. Accordingly, in embodiments, the first attribute value of "1920×1080" may be reverted to the historical attribute value of "1280×720." Other methods of reverting the first attribute value to a historical attribute value are also possible. The method 700 may conclude at block 799. Aspects of method 700 may provide performance or efficiency benefits (e.g., stream application performance, tuple processing efficiency, and computer resource usage) related to tuple attribute expiry management.

Figure 8:
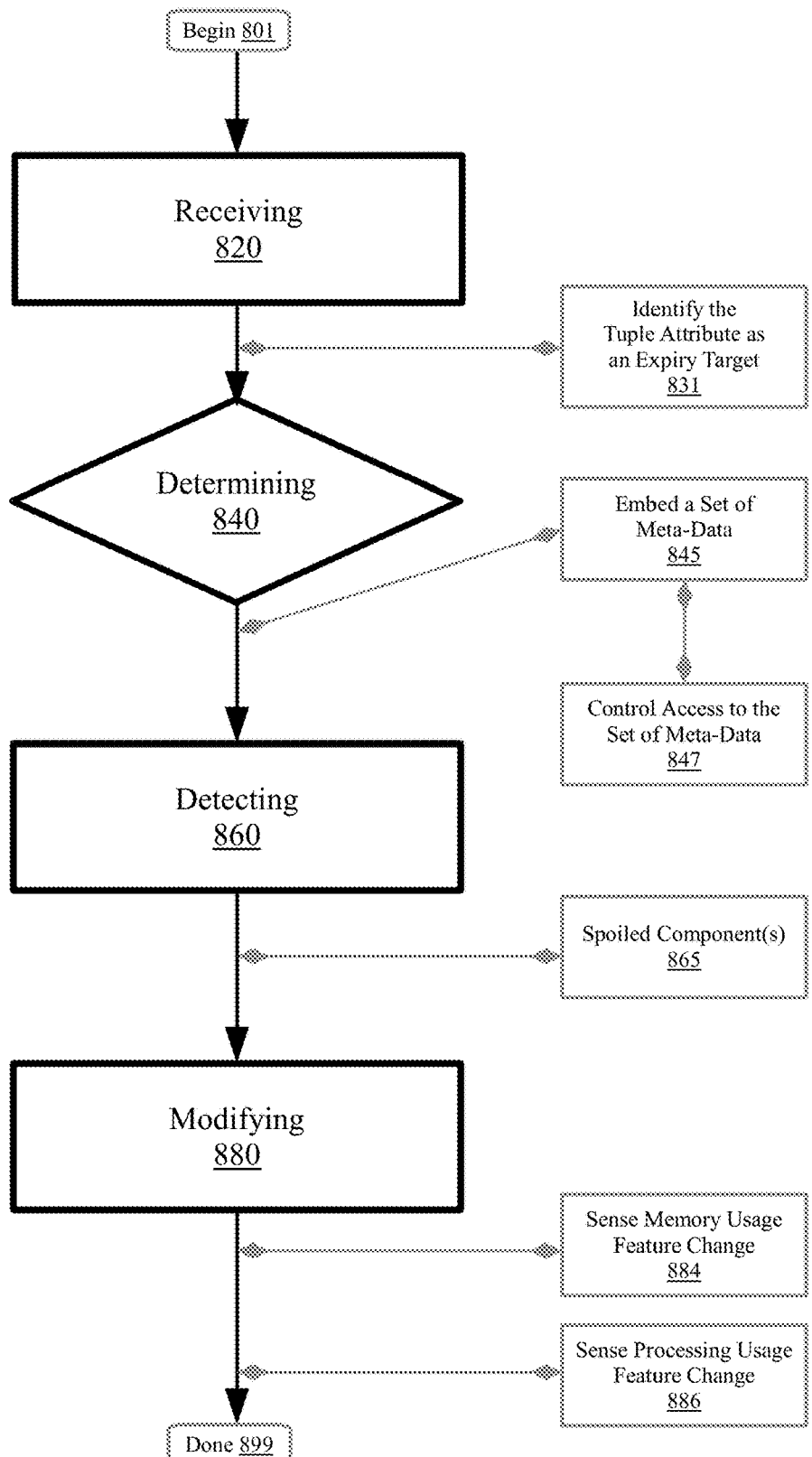
FIG. 8 is a flowchart illustrating a method for tuple attribute expiry management in a stream computing environment, according to embodiments.

FIG. 8 is a flowchart illustrating a method 800 for tuple attribute expiry management in a stream computing environment to process a stream of tuples. Aspects of FIG. 8 relate to modifying a tuple attribute of a tuple in response to detecting achievement of an expiry criterion for the tuple. The expiry criterion for the tuple attribute may be indicated by a set of meta data. The method 800 may begin at block 801. At block 820, a tuple may be received. The tuple may include a tuple attribute that has a first attribute value. At block 840, an expiry criterion may be determined for the first attribute value of the tuple attribute. At block 860, an achievement of the expiry criterion for the first attribute value of the tuple attribute may be detected. At block 880, the tuple attribute related to the first attribute value may be modified. The modification of the tuple attribute may occur in response to detecting the achievement of the expiry criterion for the first attribute value of the tuple attribute. Leveraging tuple expiration detection and tuple attribute modification operations may be associated with benefits including stream application performance, tuple processing efficiency, and computer resource usage.

In embodiments, the tuple attribute of the tuple may be identified as an expiry target at block 831. Aspects of the disclosure relate to the recognition that some tuple attributes may expire in certain situations or based on particular parameter configurations, while some tuple attributes may not expire. Accordingly, aspects of the disclosure relate to identifying the tuple attribute of one or more tuples as an expiry target. Generally, identifying can include detecting, recognizing, sensing, picking-out, designating, ascertaining, or otherwise determining that a tuple attribute of a tuple is an expiry target. An expiry target may include a label, marker, identifier, or other designation that indicates that a particular tuple attribute may expire (e.g., no longer be relevant, useful, helpful, or valid with respect to the stream computing environment) in certain situations (e.g., in response to achievement of particular conditions). As an example, a tuple attribute of "exchange rate" may be identified as an expiry target (e.g., exchange rates may change based on market movements), while a tuple attribute of "charge of an electron" may not be identified as an expiry target (e.g., as it may remain constant). In embodiments, identifying a tuple attribute of a tuple as an expiry target may be based on one or more properties or characteristics of the tuple or the tuple attribute. For instance, tuple attributes may be identified as expiry targets based on expected resource usage (e.g., tuple attributes that are associated with fluctuating resource usage may be identified as expiry targets), file size (e.g., tuple attributes associated with large files sizes may be identified as expiry targets), time-dependency (e.g., tuple attributes that include time sensitive data may be identified as expiry targets), or other factors. In embodiments, a management run-time engine of the stream computing environment may be configured to analyze the characteristics of one or more tuple attributes, and identify one or more tuples as expiry targets. In embodiments, identifying a tuple attribute of a tuple as an expiry target may include receiving a user evaluation. For instance, in certain embodiments, a developer or administrator of the stream computing environment may analyze the tuple attributes of a set of tuples, and ascertain whether or not they are expiry targets. Other methods of identifying tuples attributes as expiry targets are also possible.

In embodiments, a set of meta-data may be embedded at block 845. The set of meta-data may be embedded in association with the tuple attribute. The set of meta-data may indicate the expiry criterion for the first attribute value of the tuple attribute. Generally, embedding can include inserting, packaging, coupling, pairing, associating, linking, connecting, or otherwise bundling the set of meta-data in association with the tuple attribute. The set of meta-data may include information that describes, defines, or otherwise characterizes a tuple attribute. The set of meta-data may include pertinent or associated rules, policies, criteria, or other parameters that define how (e.g., in what situations, under what conditions) a tuple attribute expires. As an example, consider a tuple attribute of "air temperature" (e.g., for a particular city or area). In embodiments, meta-data for the tuple attribute may include information that describes how "air temperature for a given region may be a function of sunlight intensity, cloud cover, humidity, pressure, and other atmospheric factors, and may thus be time-dependent as atmospheric characteristics change." In embodiments, meta-data for the tuple attribute may indicate expiry criterion for the tuple attribute. For instance, for a tuple attribute of "value of gold," the meta-data for the tuple attribute may indicate one or more expiry criterion of a temporal factor (e.g., the value of gold may fluctuate as time goes on) and a stream operator interaction factor (e.g., the value of gold may be updated or changed based on interaction with a stream operator). As described herein, aspects of the disclosure relate to embedding the set of meta-data in association with the tuple attribute. In embodiments, embedding may include bundling the meta-data together in a single data package together with the tuple attribute. In embodiments, embedding may include saving the meta-data to the tuple that includes the associated tuple attribute. In embodiments, embedding may include saving the meta-data in a separate database or index that is logically linked with one or more associated tuple attributes. Other methods of embedding the meta-data in association with the tuple attribute are also possible.

In embodiments, access to the set of meta-data may be controlled at block 847. Access may be controlled for security to deter access to the expiry criterion by one or more non-developer users. Aspects of the disclosure relate to the recognition that, in some embodiments, it may be desirable to protect the expiry criterion from unauthorized access (e.g., unauthorized modification to the expiry criterion my impact stream computing environment performance). Accordingly, aspects of the disclosure relate to controlling access to the set of meta-data to deter access to the expiry criterion by one or more non-developer users. Generally, controlling can include regulating, governing, preventing, denying, protecting, disallowing, limiting, or otherwise managing access to the set of meta-data. In embodiments, controlling access to the set of meta-data may include configuring a set of access permissions of the set of meta-data to define users that may or may not access the set of meta-data. For instance, in embodiments, the set of access permissions may be configured to prevent non-developer users such as end-users, system administrators, supervisors, or other users not involved in development or creation of the stream computing application from accessing the set of meta-data. In embodiments, the set of access permissions may be configured to allow access to the set of meta-data to developers (e.g., individuals, groups, or organizations involved in development of the stream computing application) in order to modify the expiry criterion. As an example, the set of access permissions may implement an authentication procedure that makes use of a particular verification token (e.g., software or hardware token) only possessed by developer users in order to secure the set of meta-data. Other methods of controlling access to the set of meta-data are also possible.

In embodiments, spoiled components may occur at block 865. The tuple attribute may be resolved to have at least one component which is spoiled. Generally, resolving can include sensing, deriving, detecting, computing, identifying, ascertaining, or otherwise determining the spoiled component. The spoiled component may include an aspect of the tuple that is ascertained not to be worthwhile to process by a stream operator of the stream computing environment. In certain embodiments, the spoiled component may include data or information that is outdated or inaccurate, such that processing it may adversely impact the stream computing environment. The spoiled component may include the first attribute value of a tuple attribute, the tuple attribute itself, or the entire tuple. In embodiments, the spoiled component of the tuple attribute may be resolved based on detecting that an attribute value of the tuple attribute achieves an expiry criterion. For instance, in response to detecting that an attribute value of the tuple attribute achieves an expiry criterion, the management run-time engine may scan the tuple to evaluate whether the tuple includes information that is relevant or worth processing by the stream computing environment. In the event that no relevant or useful data is discovered, the tuple attribute may be marked as a spoiled component.

Consider the following example. A stream computing application may be configured to transmit measured sensor status information for a jet engine in real-time. A particular tuple may be include a tuple attribute of "blade speed" associated with a first attribute value of "1611.8 kilometers per hour." The stream computing application may encounter a transmission interruption, such that the particular tuple is transmitted after a delay of 31 seconds. A management run-time engine may scan the particular tuple prior to management by a streaming operator, and detect that the first attribute value of "1611.8 kilometers per hour" achieves an expiry criterion of "temporal factor-20 seconds." Accordingly, as described herein, the first attribute value may be resolved as a spoiled component (e.g., processing the tuple may convey inaccurate/outdated information to the stream computing application that may negatively impact performance of the jet engine). Other methods of resolving the spoiled component are also possible.

In embodiments, a memory usage feature change may be sensed at block 884. The sensing of the memory usage feature change may occur in response to modifying the tuple attribute related to the first attribute value. Generally, sensing may include detecting, recognizing, discovering, identifying, ascertaining, or determining the memory usage change feature. The memory usage feature change may include a fluctuation, variation, or other change in the amount of memory used by the stream computing environment. In embodiments, sensing the memory usage feature change may include utilizing a memory diagnostic tool to analyze the memory resources used by the stream computing environment to maintain the stream of tuples in the operator graph, and detecting a reduction in the amount of tuples in the operator graph (e.g., as a result of the tuple attribute modification operation to manage expired tuple attributes). Other methods of sensing the memory usage feature change are also possible. In embodiments, a processing usage feature change may be sensed at block 886. The sensing of the processing usage feature change may occur in response to modifying the tuple attribute related to the first attribute value. Generally, sensing may include detecting, recognizing, discovering, identifying, ascertaining, or determining the processing usage feature change. The processing usage feature change may include a fluctuation, variation, or other change in the amount of processing resources used by the stream computing environment. In embodiments, sensing the processing usage feature change may include using a management run-time engine to collect data regarding the processing resources used by each stream operator of the stream computing environment, and aggregating the data to generate a total figure for the amount of processing resources used by the stream computing environment. In embodiments, sensing may include detecting a reduction in the amount of processing resources used by the stream computing environment, the time necessary to process tuples, the wear-rate of one or more components, or other factors (e.g., as a result of the tuple attribute modification operation to manage expired tuple attributes.)

Consider the following example. A stream of tuples which include a tuple attribute of "stock price" may be received by a stream computing environment. The tuple attribute of "stock price" may be associated with a first attribute value of "$18.36" that indicates the stock price per share of a particular stock. In embodiments, the first attribute value may be associated with a first expiry criterion of an attribute value change factor that indicates that the first attribute value may be considered to be expired when it changes by 10% or more. The first attribute value may be associated with a second expiry criterion of a temporal factor that indicates that the first attribute value may be considered to be expired when 4 hours pass. The stream of tuples may flow through the operator graph of the stream computing environment and be processed by a number of stream operators. In embodiments, each stream operator that receives the stream of tuples may be configured to evaluate each tuple with respect to the expiry criterion and ascertain whether it has expired or if it is still valid. In embodiments, as described herein, one or more tuples may be processed by a particular streaming operator that detects that the first attribute value has changed to "$24.91" (e.g., a change of more than 10%, achieving the first expiry criterion). Accordingly, as described herein, in response to detecting that the expiry criterion is achieved, the tuple attribute of "stock price" may be modified. For instance, in embodiments, the tuple attribute of "stock price" may be discarded (e.g., removed, deleted, erased) from one or more tuples of the stream of tuples. As a result of the decreased number of tuple attributes the stream computing environment may detect a reduction in the amount of data in the operating graph, the time necessary to process the stream of tuples, and the processing resources used to process the stream of tuples. Other methods of tuple attribute expiry management in a stream computing environment are also possible. The method 800 may conclude at block 899. Aspects of method 800 may provide performance or efficiency benefits related to tuple attribute expiry management.

Figure 9:
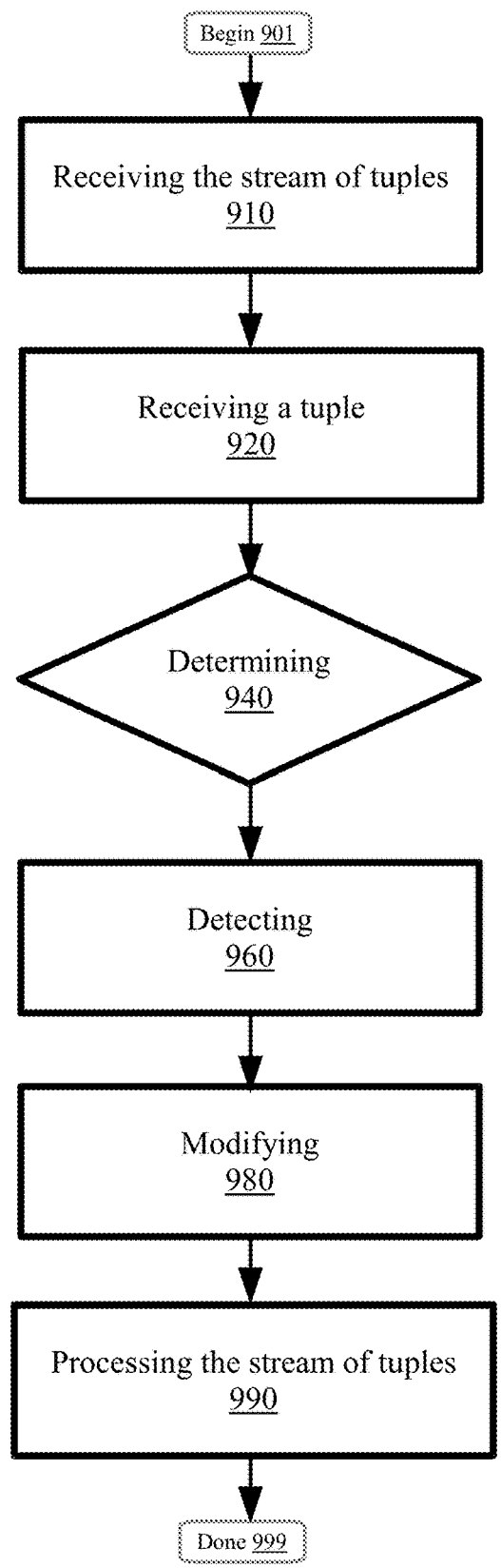
FIG. 9 is a flowchart illustrating a method for tuple attribute expiry management in a stream computing environment, according to embodiments.

FIG. 9 is a flowchart illustrating a method 900 for tuple attribute expiry management in a stream computing environment to process a stream of tuples. Aspects of the method 900 may relate to receiving and processing a stream of tuples. The method 900 may begin at block 901. At block 920, a tuple may be received. The tuple may include a tuple attribute that has a first attribute value. At block 940, an expiry criterion may be determined for the first attribute value of the tuple attribute. At block 960, an achievement of the expiry criterion for the first attribute value of the tuple attribute may be detected. At block 980, the tuple attribute related to the first attribute value may be modified. The modification of the tuple attribute may occur in response to detecting the achievement of the expiry criterion for the first attribute value of the tuple attribute.

At block 910, the stream of tuples may be received. The stream of tuples may be processed by a plurality of processing elements (e.g., stream operators) operating on a set of compute nodes (e.g., in a stream application environment). The stream of tuples may be received consistent with the description herein including FIGS. 1-9. Current/future processing by the plurality of processing elements may be performed consistent with the description herein including FIGS. 1-9. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 990, the stream of tuples may be processed. The stream of tuples may be processed by the plurality of processing elements operating on the set of compute nodes. The stream of tuples may be processed consistent with the description herein including FIGS. 1-9. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators. The method 900 may conclude at block 999.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for tuple attribute expiry management in a stream computing environment to process a stream of tuples, the method comprising:

receiving, by a first stream operator from a first source, a first tuple which includes a first tuple attribute that has a first attribute value;

determining, by the first stream operator, an expiry criterion for the first attribute value of the first tuple attribute;

performing, by the first stream operator, a first operation on the first tuple, wherein the first attribute value of the first attribute of the first tuple is changed in response to the first operation;

sending, by the first stream operator, the first tuple to a second stream operator;

detecting, by the second stream operator, an achievement of the expiry criterion for the first attribute value of the first tuple attribute; and modifying, in response to detecting the achievement of the expiry criterion for the first attribute value of the first tuple attribute, the first tuple attribute and the first attribute value;

monitoring, by a streams management run-time engine, for the achievement of the expiry criterion for the first attribute value of the first tuple attribute;

performing, by the streams management run-time engine in response to detecting the achievement of the expiry criterion for the first attribute value of the first tuple attribute, a tuple attribute modification operation to modify the first tuple attribute related to the first attribute value; and determining the expiry criterion for the first attribute value of the first tuple attribute is based on a tuple attribute change factor, wherein the tuple attribute change factor represents a threshold of change from the first tuple attribute.

2. The method of claim 1, further comprising:
identifying, as an expiry target, the tuple attribute of the first tuple.

3. The method of claim 1, further comprising:
embedding, in association with the first tuple attribute, a set of meta-data which indicates the expiry criterion for the first attribute value of the first tuple attribute; and
controlling access to the set of meta-data to deter access to the expiry criterion by one or more non-developer users.

4. The method of claim 1, wherein modifying the first tuple attribute includes eliminating the first tuple attribute of the first tuple.

5. The method of claim 1, wherein modifying the first tuple attribute includes introducing, for the first attribute value, a predetermined attribute value.

6. The method of claim 5, wherein the predetermined attribute value is a null value, wherein the null value prevents further operations on the first tuple by the first stream operator.

7. The method of claim 1, wherein modifying the first tuple attribute includes reverting the first attribute value to a historical attribute value of the first tuple attribute.

8. The method of claim 1, wherein determining the expiry criterion for the first attribute value of the first tuple attribute is based on a stream operator interaction factor.

9. The method of claim 1, wherein:
determining the expiry criterion for the first attribute value of the first tuple attribute is based on a temporal factor.

10. The method of claim 1, wherein determining the expiry criterion for the first attribute value of the first tuple attribute is based on a throughput factor.

11. The method of claim 1, further comprising:
resolving that the first tuple attribute has at least one component which is spoiled;
sensing, in response to modifying the first tuple attribute related to the first attribute value, a memory usage feature change; and
sensing, in response to modifying the first tuple attribute related to the first attribute value, a processing usage feature change.

12. The method of claim 1, further comprising:
receiving, by the first stream operator from the first source, a second tuple which includes a second tuple attribute that has a second attribute value; and
performing, by the first stream operator, a second operation, wherein the second operation combines the first tuple and the second tuple into a third tuple.

13. The method of claim 1, wherein the first tuple further includes a third tuple attribute with a third attribute value, and wherein the first operation comprises:
dividing the first tuple into a fourth tuple and a fifth tuple, wherein the fourth tuple includes the third tuple attribute with the third attribute value, and wherein the fifth tuple includes the first tuple attribute with the first attribute value.

14. The method of claim 13, further comprising:
sending, by the first stream operator, the fifth tuple to the second stream operator; and
sending, by the first stream operator, the fourth tuple to a third stream operator.

15. A system for tuple attribute expiry management in a stream computing environment to process a stream of tuples, the system comprising:
a memory having a set of computer readable computer instructions, and
a processor for executing the set of computer readable instructions, the set of computer readable instructions including:
receiving, by a first stream operator from a first source, a first tuple which includes a first tuple attribute that has a first attribute value;
determining, by the first stream operator, an expiry criterion for the first attribute value of the first tuple attribute;
performing, by the first stream operator, a first operation on the first tuple, wherein the first attribute value of the first attribute of the first tuple is changed in response to the first operation;
sending, by the first stream operator, the first tuple to a second stream operator;
detecting, by the second stream operator, an achievement of the expiry criterion for the first attribute value of the first tuple attribute;
modifying, in response to detecting the achievement of the expiry criterion for the first attribute value of the first tuple attribute, the first tuple attribute and the first attribute value;
monitoring, by a streams management run-time engine, for the achievement of the expiry criterion for the first attribute value of the first tuple attribute;
performing, by the streams management run-time engine in response to detecting the achievement of the expiry criterion for the first attribute value of the first tuple attribute, a tuple attribute modification operation to modify the first tuple attribute related to the first attribute value; and
determining the expiry criterion for the first attribute value of the first tuple attribute is based on a tuple attribute change factor, wherein the tuple attribute change factor represents a threshold of change from the first tuple attribute.

16. A computer program product for tuple attribute expiry management in a stream computing environment to process a stream of tuples, the computer program product comprising a computer readable storage medium having program instructions embodied therewith, wherein the computer readable storage medium is not a transitory signal per se, the program instructions executable by a processor to cause the processor to perform a method comprising:

receiving, by a first stream operator from a first source, a first tuple which includes a first tuple attribute that has a first attribute value;

determining, by the first stream operator, an expiry criterion for the first attribute value of the first tuple attribute;

performing, by the first stream operator, a first operation on the first tuple, wherein the first attribute value of the first attribute of the first tuple is changed in response to the first operation;

sending, by the first stream operator, the first tuple to a second stream operator;

detecting, by the second stream operator, an achievement of the expiry criterion for the first attribute value of the first tuple attribute; and modifying, in response to detecting the achievement of the expiry criterion for the first attribute value of the first tuple attribute, the first tuple attribute and the first attribute value; and monitoring, by a streams management run-time engine, for the achievement of the expiry criterion for the first attribute value of the first tuple attribute;

performing, by the streams management run-time engine in response to detecting the achievement of the expiry criterion for the first attribute value of the first tuple attribute, a tuple attribute modification operation to modify the first tuple attribute related to the first attribute value; and determining the expiry criterion for the first attribute value of the first tuple attribute is based on a tuple attribute change factor, wherein the tuple attribute change factor represents a threshold of change from the first tuple attribute.

17. The computer program product of claim 16, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to the remote data processing system for use in a second computer readable storage medium with the remote data processing system.

* * * * *